June 11, 1940.  W. STAHLECKER  2,204,515
ROLL FOR TEXTILE MACHINERY
Filed June 14, 1939

INVENTOR:
Wilhelm Stahlecker
BY Chas Lyon Russell
HIS ATTORNEY

Patented June 11, 1940

2,204,515

UNITED STATES PATENT OFFICE 2,204,515

ROLL FOR TEXTILE MACHINERY

Wilhelm Stahlecker, Stuttgart-Bad Cannstatt, Germany, assignor to Vereinigte Kugellagerfabriken A. G. Schweinfort, Werk Bad-Cannstatt, Germany, a corporation of Germany Application June 14, 1939, Serial No. 279,078
In Germany June 15, 1938

1 Claim. (Cl. 19—141)

This invention relates to rolls for textile machinery and has for an object to provide means supporting such roll particularly when formed several sections.

According to the present invention, the steel ll is sub-divided in single roll pieces of suitle length which are individually supported and ter-connected by means of a flexible clutch, the aring being arranged at the side.

In this way the possibility is given to arrange bearing of a sufficient size, without having to duce the size of the bearing or the pin. Thus is also possible to arrange ball or roller bearings sufficient load capacity and to profit by the vantage of such a bearing.

The special arrangement of the bearing in conction with a flexible clutch between the roll eces overcomes the disadvantages of ordinary aring arrangements. However also in this case, e has to expect misalignments in the bearings, it the load on the bearings can be ascertained advance on account of the bearing clearance d the aligning-angle, and thus the bearing can adjusted accordingly.

An example may serve to particularly explain e character of this invention.

Figure 1:
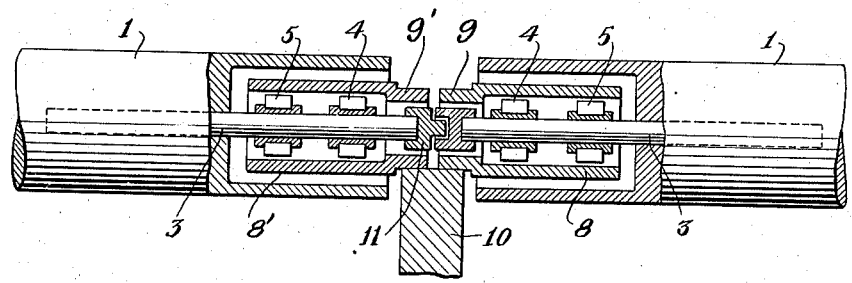
Figure 1 shows partly in section the ends of two eel rolls with roll pins and bearings.

The steel roll I which is commonly fluted has pressed-in pin 3. On this pin 3 are placed two ller bearings 4 and 5 with their inner races 6 nd 7. The bearings are running in the bolster and this usually under misalignment, whereby e greatest angle of misalignment is caused rough the clearance of the bearings, regardless e bending of the bearing pin. In consequence f the misalignment there arises the bearing learance space a at the bearing 4 and space b t the bearing 5.

The bearings themselves can be made of a sufficiently strong design, so that no overload will arise through the misalignment.

Figure 2:
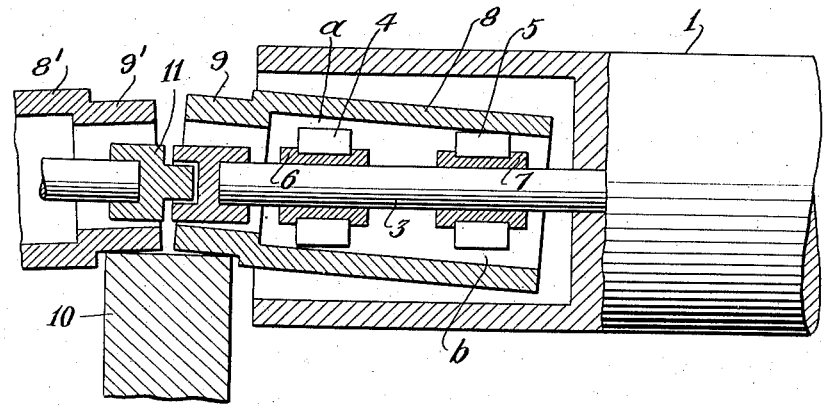
Figure 2 shows these parts in an enlarged scale d an exaggerated degree of misalignment.

The misalignment, as far as it comes from the load acting on the roll, produces the inclined position of the bearing housing 8 and 8' as shown in Figure 2, which by the way is shown in a somewhat exaggerated position. Through this misalignment a thrust effect in the direction of the roller bearing centre-line is being produced in the roller bearing, which may, in this case, be partly or entirely eliminated, because the angles of inclination of the housing axis are of opposite direction. The additional load given by the misalignment of the bearings, can be supported by the latter, since the bearings have a suitable load capacity as mentioned above.

Figure 3:
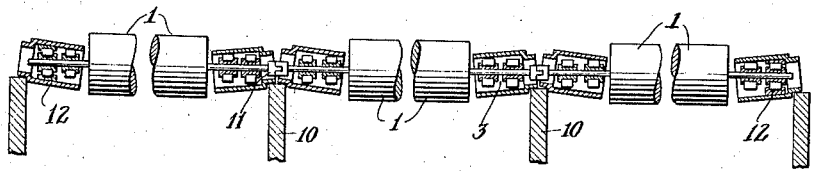
Figure 3 shows in a smaller scale three broken ll pieces with their bearings shown disposed itside of the roll ends, the parts being shown iisaligned in an exaggerated way.

At the ends of the assembly consisting of the various roll pieces, it is convenient to have one of the antifriction bearings mounted for carrying the thrust load, in Figure 3 this is being done by the bearing 12 at each end of the entire roll line.

The bearing housing 8 holding the bearings 4, 5 and 12 rests with a bearing neck 9 upon the support 10. The clutch 11 which loosely connects the bearing pins 3 with each other, and does not cause overloads if misalignments arise, is arranged inside the bearing-neck adjacent the position where the neck of the housing is supported.

Having thus described my invention, I claim and desire to secure by Letters Patent the following:

In a roll for textile machines, the combination of adjacent roll sections having cylindrical recesses at their ends, journals at the ends of each section, non-rotating housing, antifriction bearings mounted therein, the major portion of said housings entering into the cylindrical recesses, a stationary support, each housing having a neck portion resting on said stationary support, non-rigid coupling members for the ends of the journals disposed inside of the supported ends of the housings, the bearings located at the ends of the complete roll line being mounted for taking endwise thrust of the rolls, each of said roll sections being removable without the removal of the bearings or coupling members.

WILHELM STAHLECKER.